United States Patent
Van Dine et al.

[19]

[11] Patent Number: 6,150,743
[45] Date of Patent: *Nov. 21, 2000

[54] COMPOSITE MOTOR END HOUSING WITH A METALLIC SLEEVE BEARING SUPPORT

[75] Inventors: Piet Van Dine, Stonington, Conn.; Vladimir Odessky, North Brunswick, N.J.; Brian E. Spencer, Lincoln, Nebr.; James S. Smith, Old Lyme; William R. Harring, Oakdale, both of Conn.

[73] Assignee: Electric Boat Corporation, Groton, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/840,065

[22] Filed: Apr. 24, 1997

[51] Int. Cl.[7] .............................. H02K 5/02; H02K 5/04; H02K 5/15; H02K 5/20
[52] U.S. Cl. .............................. 310/89; 310/43; 310/90; 310/58
[58] Field of Search .................................. 310/89, 90, 43, 310/52, 91, 58, 59

[56] References Cited

U.S. PATENT DOCUMENTS

| | | | |
|---|---|---|---|
| 1,808,845 | 6/1931 | Gifford et al. | 310/52 |
| 2,763,769 | 9/1956 | Happe | 310/89 |
| 3,873,864 | 3/1975 | Apostoleris | 310/89 |
| 4,048,530 | 9/1977 | Kaufman, Jr. | 310/89 |
| 4,484,094 | 11/1984 | Ade et al. | 310/43 |
| 4,614,886 | 9/1986 | Schneider et al. | 310/83 |
| 4,631,433 | 12/1986 | Stokes | 310/89 |
| 4,705,983 | 11/1987 | Franz et al. | 310/68 D |
| 4,729,160 | 3/1988 | Brown | 29/598 |
| 4,823,032 | 4/1989 | Ward et al. | 310/43 |
| 4,879,483 | 11/1989 | Barahia | 310/63 |
| 4,918,324 | 4/1990 | Isozumi | 290/48 |
| 4,996,016 | 2/1991 | Walls et al. | 264/229 |
| 5,026,476 | 6/1991 | Ishimoto et al. | 310/89 |
| 5,047,679 | 9/1991 | Baader et al. | 310/89 |
| 5,072,145 | 12/1991 | Davis et al. | 310/54 |
| 5,073,735 | 12/1991 | Takagi | 310/71 |
| 5,126,608 | 6/1992 | Sogabe et al. | 310/71 |
| 5,138,208 | 8/1992 | Kondo et al. | 310/64 |

FOREIGN PATENT DOCUMENTS

| | | |
|---|---|---|
| 1153177 | 3/1958 | France . |
| 2234119 | 1/1975 | France . |
| 2503574 | 8/1976 | Germany . |
| 2176060 | 12/1996 | United Kingdom . |

OTHER PUBLICATIONS

European Search Report mailed Oct. 22, 1999 in application No. EP 98 20 1248.

*Primary Examiner*—Karl E. Tamai
*Attorney, Agent, or Firm*—BakerBotts, LLP

[57] ABSTRACT

An electric motor housing including a metal internal hub and composite material reduces weight, reduces motor vibration transmission, increases mechanical damping, improves corrosion resistance and improves electrical performance.

5 Claims, 4 Drawing Sheets

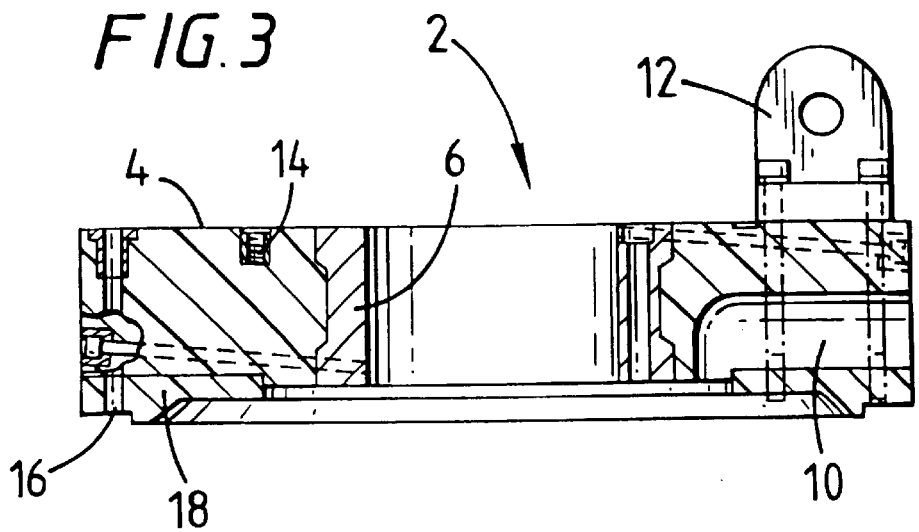
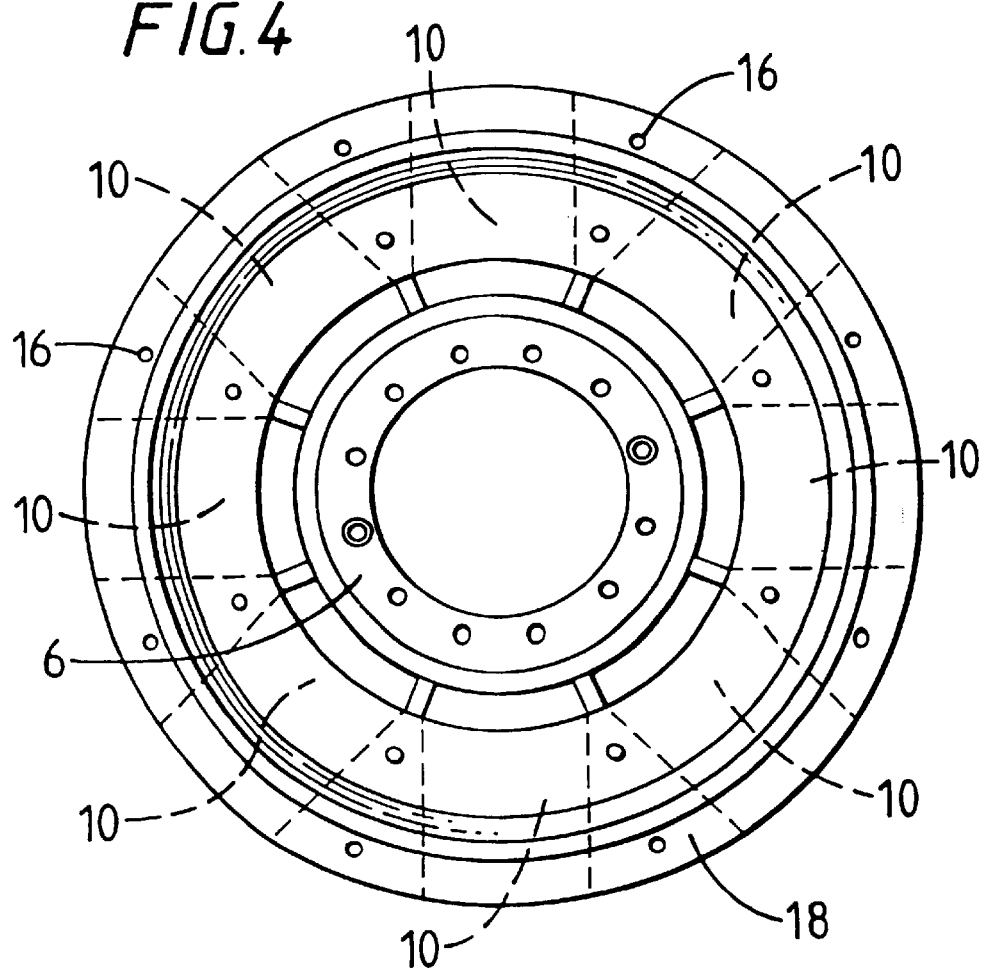

COMPOSITE MOTOR END HOUSING WITH A METALLIC SLEEVE BEARING SUPPORT

BACKGROUND OF THE INVENTION

This invention relates to housings for electric motors and, more particularly, a motor housing having reduced weight and vibration transmission and improved mechanical damping, improved corrosion resistance and improved motor performance.

Conventional housings for electric motors are typically formed from fabricated cast or forged metal. The metals used in the housings include steel or corrosion resistant alloys. The damping properties, weight and other characteristics of the housing are a function of the materials used to construct the housing as well as the geometry of motor construction.

SUMMARY OF INVENTION

Accordingly, it is an object of the invention to provide an electric motor housing which has reduced weight and reduced vibration transmission.

It is also an object of the invention to provide an electric motor housing which provides improved corrosion resistance and improves motor performance.

It is a further object of the invention to provide an electric motor housing which provides improved corrosion resistance and improves motor performance.

These and other objects of the invention are obtained by providing an electric motor housing including a substantially cylindrical housing member having a front end part formed from a nonmetallic material having an inner metal rotor bearing sleeve.

BRIEF DESCRIPTION OF THE DRAWINGS

Further objects and advantages of the invention will be more fully appreciated from a reading of the detailed description when considered with the accompanying drawings wherein:

FIG. 3 is a cross sectional view of the front end housing part of the motor housing taken along line III—III of FIG. 1 and looking in the direction of the arrows;

FIG. 4 is a side view of the front end housing part of the motor housing showing the side opposite from that shown in FIG. 1;

DESCRIPTION OF THE PREFERRED EMBODIMENTS

Figure 1:
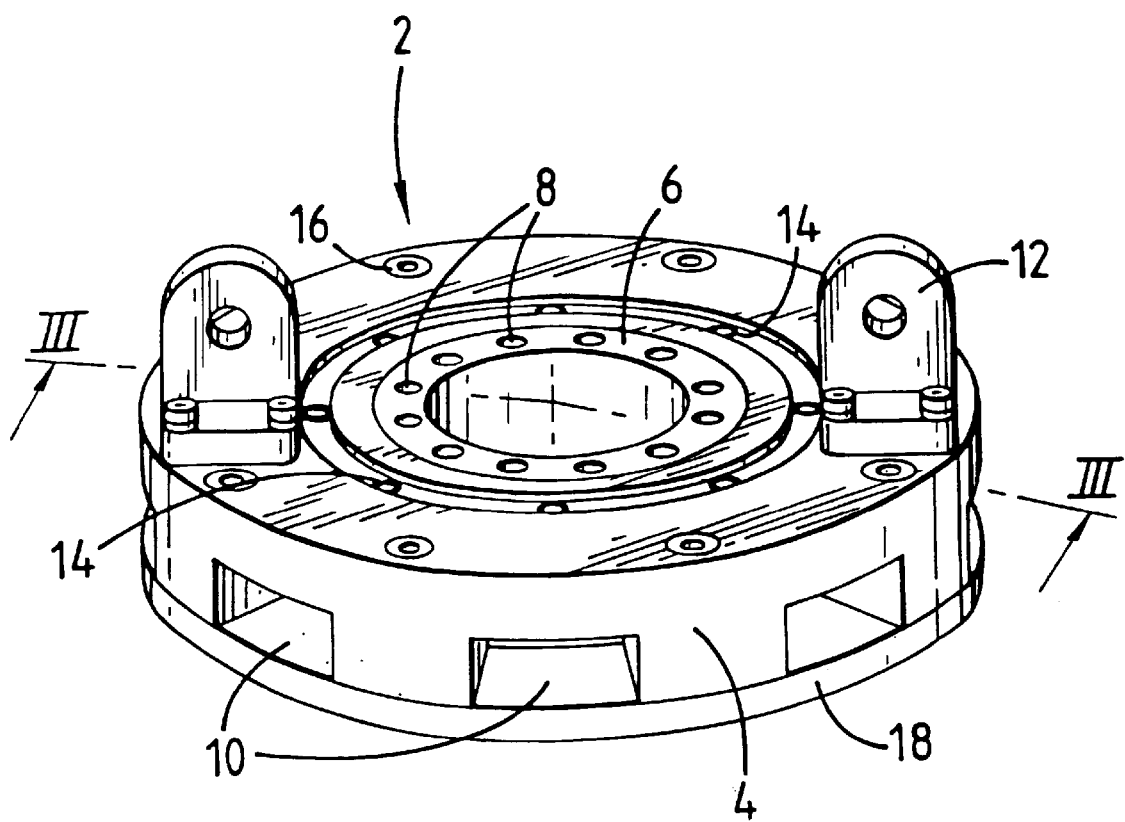
FIG. 1 is a perspective view of the front end housing part of a representative embodiment of a composite motor housing in accordance with the invention.

As shown in the representative embodiment illustrated in the drawings, the front end housing part 2 of an electric motor housing according to the invention is substantially cylindrical in shape and has a wall 4 which is formed from a composite material. The front end housing part 2 includes a main bearing support for the motor drive shaft consisting of a metal hub rotor bearing sleeve 6 embedded in the composite wall 4 and bolt holes for assembly of the front end housing part 2 into a stator frame housing part 20 of the motor housing.

In order to provide air cooling of the motor, ventilating apertures 10 are provided in the composite wall 4. In addition, metal lifting lugs 12 in the front end housing part 2 provide attachment points for lifting and rigging of the electric motor and pump assembly. Threaded metal inserts 14 are provided in the front end housing part 2 for a cover guard 27 shown in FIG. 2. Through holes 16 contain metal fastener sleeves embedded in the composite wall, to act as a bearing surface for hold down fasteners (not shown in FIG. 1) for connecting the front end housing part 2 to the stator frame housing part 20. A metal bottom plate 18 aligns the front end housing part to the stator frame housing part 20.

Figure 2:
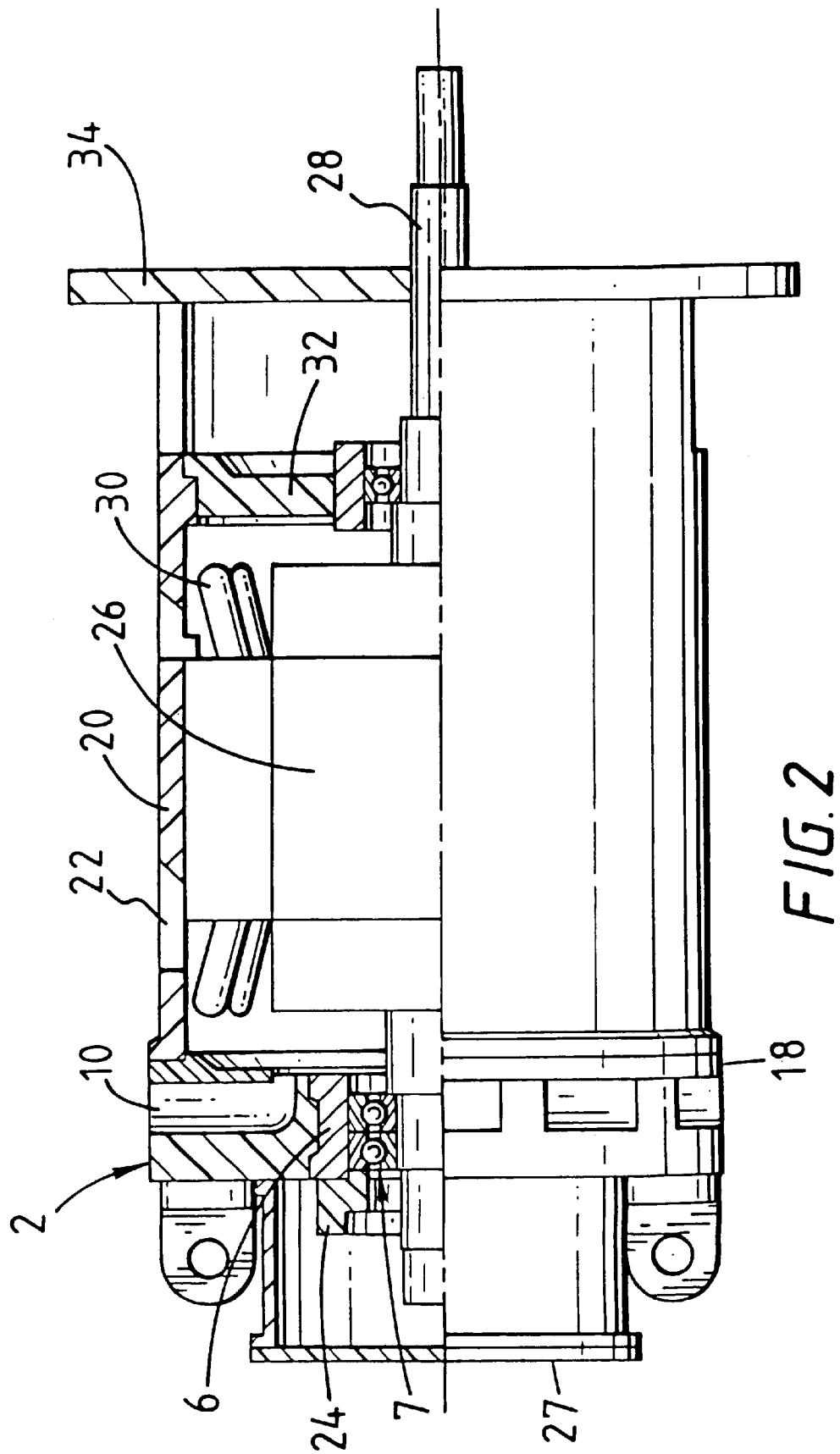
FIG. 2 is a longitudinal sectional view of a composite motor housing and rotor shaft arranged according to the invention.

As shown in the upper portion of FIG. 2, which is a section view of the motor assembly, the front end housing part 2 is attached the stator frame housing part 20 of the motor assembly which may be composed of metal and/or composite material. The stator frame housing part 20 is formed with ventilating apertures 22 which, in cooperation with the ventilating apertures 10 in the front end housing part, permit air to circulate through the motor housing. A metal bearing cap 24 is attached to the metal rotor bearing sleeve 6 to retain a rotor shaft thrust bearing 7. A rotor 26 for the motor is supported on a shaft 28 which is received in the rotor shaft thrust bearing 7. The shaft 28 contains both metal and composite resin material. Stator windings 30 are located within the stator frame housing part 20 to produce rotation of the rotor when energized. The end of the motor housing opposite the front end housing part 2 has a pulley end housing part 32 mounted on the stator frame housing part which may also be made of composite material. The pulley end of the stator frame housing part is equipped with a metal or composite mounting flange 34.

As shown in the sectional view of FIG. 3, the front end housing part 2 of the motor housing consists of a relatively large proportion of composite material, i.e. more than 50 percent, thereby making it lighter and easier to fabricate.

Figure 5:
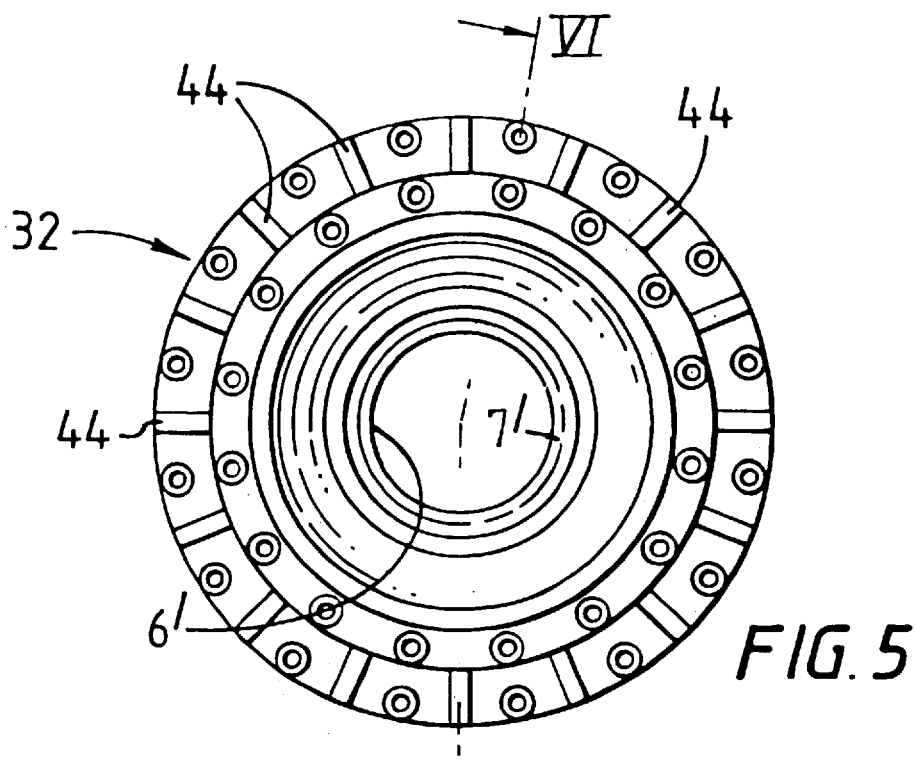
FIG. 5 is a sectional view of a pulley end housing part in the motor assembly shown in FIG. 2.

FIG. 5 illustrates an end view of the side of the housing shown in FIG. 2 which faces the pulley end of the motor, including thrust bearing 7a.

As best seen in FIG. 4, the front end housing part 2 of the motor assembly includes eight ventilating apertures 10, which provide a cooling air flow path for the motor.

FIG. 5 illustrates an end view of the pulley end housing part 32 shown in FIG. 2 which faces the pulley end of the motor and supports a pulley end thrust bearing 7' for the rotor shaft 28. The pulley end housing part 32 is made of composite material 4' and is formed with gussets 44 and ventilating apertures 10'.

Figure 6:
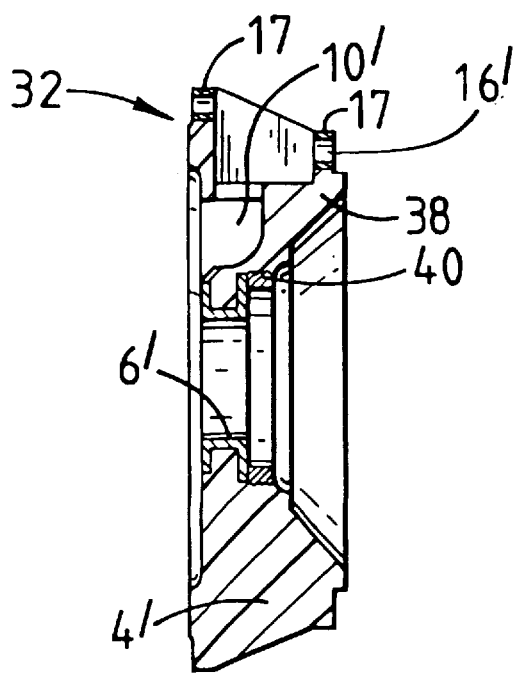
FIG. 6 is a partial view of the pulley end housing part shown in FIG. 5, taken along the line VI—VI of FIG. 5 and looking in the direction of the arrows.

A cut-away view taken along line VI—VI of FIG. 5 is shown in FIG. 6. Metal bushings 17 surrounding through holes 16' provide a bearing surface for the housing closure bolts. A main bearing hub sleeve 38 receives a pulley end rotor bearing sleeve 6' in which the bearing 7' is supported. The sleeve 6' is mounted in the composite material 4' of the pulley end housing part 32 with a threaded insert 40.

Figure 7:
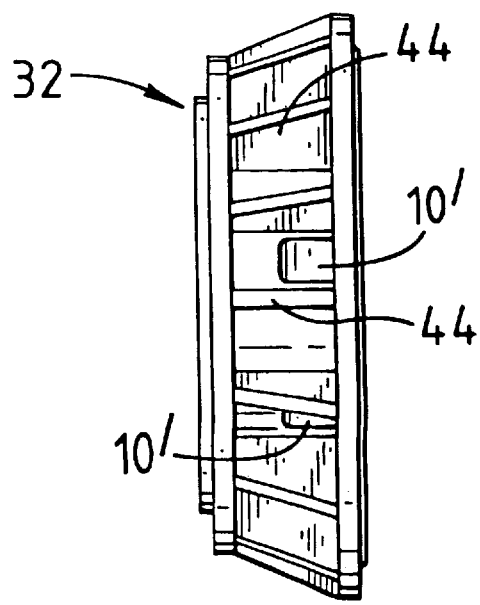
FIG. 7 is a sectional view of an edge of the pulley end housing part of the motor housing shown in FIGS. 5–6.

An edge view of the pulley end housing part 32 of the motor housing is shown in FIG. 7. As can be seen from FIG. 7 the ventilating apertures 10' are located between the gussets 44.

A motor housing in accordance with the invention may be prepared by providing a metal cylinder, bonding composite plates around the metal cylinder so as to form a metal within composite cylinder and then curing between metal plates under full vacuum at a temperature of 300° F. for 360 minutes. Thereafter, the air passages are machined into the composite material.

The metal parts used in the motor housing can be formed of any suitable metal, preferably steel or corrosion resistant metal alloy. Suitable nonmetallic composite material includes but is not limited to composites made from resin with or without high strength, high modulus fiber such as fiberglass, graphite, carbon, boron, quartz and aramid fibers, i.e. aromatic polyamide fibers characterized by excellent high temperature, flame resistance and electrical properties.

The nonmetallic portions of the motor housing reduce weight and vibration transmission as compared to housings made of metal. The increased damping provided by the nonmetallic portions results in damping of vibrations. This damping minimizes the detrimental forces imparted by a motor on the driven component as well as forces imparted by the driven component on the motor. The changes in stiffness and inertia of the housing by the incorporation of nonmetallic materials results in increased absorption of vibratory energy.

Moreover, the motor housing according to the invention has improved corrosion resistance since nonmetallic composite material is inert in most environments, while housings made of steel or other metals are subject to corrosion in certain environments.

The use of composite materials in a motor housing facilitates the fabrication of a motor with complex geometries and allows variation of motor damping along the length of the motor to further attenuate vibratory energy. Varying the thickness and fiber laying geometry in the composite housing may be used to control motor housing strength, stiffness and damping characteristics.

Although the invention has been described herein with respect to specific embodiments, many modifications and variations therein will readily occur to those skilled in the art. Accordingly, all such variations and modifications are included with the intended scope of the invention.

We claim:

1. An electric motor housing having a removable front end housing part, comprising:

a substantially cylindrical stator frame housing part comprising a composite nonmetallic material, the substantially cylindrical stator frame housing part including ventilating apertures, and the front end housing part attached to and enclosing one end of the substantially cylindrical stator frame housing part, wherein the front end housing part completely covers the one end of the substantially cylindrical stator housing part, the front end housing part having a wall comprising nonmetallic composite material with a metallic bearing sleeve inserted in the nonmetallic material and a metal bottom plate attached to the substantially cylindrical stator housing part.

2. An electric motor housing according to claim 1 including metal lifting lugs mounted in the nonmetallic material of the front end part.

3. An electric motor according to claim 1 comprising a rotor shaft comprising nonmetallic material and having a support portion supported in the metallic bearing sleeve.

4. An electric motor housing according to claim 1 wherein the nonmetallic material is selected from the group consisting of fiberglass and graphite carbon, boron, quartz and aramid fibers.

5. An electric motor housing according to claim 1 wherein the front end housing part further comprises at least one metallic fastener sleeve for receiving fastening means for connecting the front end housing part to the substantially cylindrical stator housing part, the at least one metallic fastener embedded in the nonmetallic material in the front end housing part to fasten the front end housing part to the substantially cylindrical stator housing part.

\* \* \* \* \*

UNITED STATES PATENT AND TRADEMARK OFFICE
CERTIFICATE OF CORRECTION

PATENT NO. : 6,150,743
DATED : November 21, 2000
INVENTOR(S) : Van Dine et al.

It is certified that error appears in the above-identified patent and that said Letters Patent is hereby corrected as shown below:

<u>Column 2,</u>
Lines 44-46, delete lines 44-46 in their entirety.

Signed and Sealed this

Second Day of October, 2001

Attest:

*Nicholas P. Godici*

NICHOLAS P. GODICI
*Attesting Officer*    *Acting Director of the United States Patent and Trademark Office*